United States Patent
Shu et al.

(10) Patent No.: US 12,147,042 B2
(45) Date of Patent: Nov. 19, 2024

(54) FOLDING OPTICAL WAVEGUIDE NEAR-TO-EYE DISPLAY DEVICE

(71) Applicant: Wei Shu, Guangdong (CN)

(72) Inventors: Wei Shu, Guangdong (CN); Manli Guo, Guangdong (CN); Xiaoguang He, Guangdong (CN)

(73) Assignee: Wei Shu, Guangzhou (CN)

( * ) Notice: Subject to any disclaimer, the term of this patent is extended or adjusted under 35 U.S.C. 154(b) by 470 days.

(21) Appl. No.: 17/570,359

(22) Filed: Jan. 6, 2022

(65) Prior Publication Data
US 2023/0063932 A1    Mar. 2, 2023

(30) Foreign Application Priority Data

Aug. 27, 2021    (CN) .......................... 202110996666.7

(51) Int. Cl.
G02B 27/01    (2006.01)
G02B 27/09    (2006.01)

(52) U.S. Cl.
CPC ..... G02B 27/0172 (2013.01); G02B 27/0972 (2013.01); *G02B 2027/013* (2013.01)

(58) Field of Classification Search
CPC ... G02B 27/01–0189; G02B 2027/0105–0198; G02B 27/0972
See application file for complete search history.

(56) References Cited

U.S. PATENT DOCUMENTS

| | | | | |
|---|---|---|---|---|
| 2015/0323788 A1* | 11/2015 | Zou | ......................... | G02B 27/30 359/630 |
| 2021/0149199 A1* | 5/2021 | Guan | ....................... | G02B 5/04 |

* cited by examiner

*Primary Examiner* — Bao-Luan Q Le
*Assistant Examiner* — Christopher A Lamb, II

(57) ABSTRACT

Disclosed herein is a folding optical waveguide near-to-eye display device, including: an image source (111), a prism (121) with a cylindrical surface, a curved lens (131), a prism (141), and a prism group (151) connected by two or more prisms glued together in sequence, where a prism surface of the prism (121) is partially or completely a cylindrical surface, the cylindrical surface faces the image source (111), the prism (121) is connected to the prism (141) through a prism surface other than the cylindrical surface to form a first gluing surface, the prism (121) is connected with an opposite surface of a curved surface of the curved lens (131) through another prism surface other than the cylindrical surface to form a second gluing surface, and the prism (141) and the prisms of the prism group (151) are glued and connected in sequence.

8 Claims, 1 Drawing Sheet

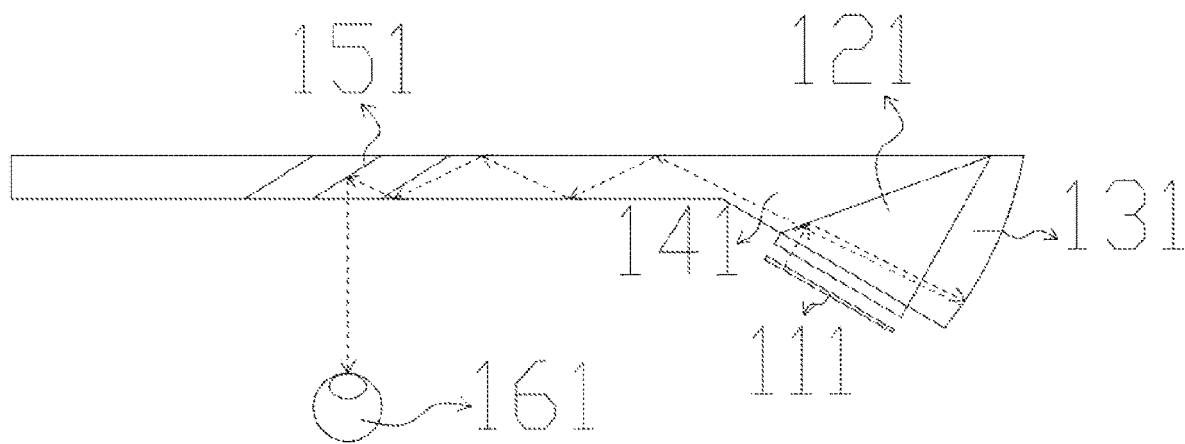

FOLDING OPTICAL WAVEGUIDE NEAR-TO-EYE DISPLAY DEVICE

CROSS REFERENCE TO RELATED APPLICATIONS

The present application claims the benefit of Chinese Patent Application No. 202110996666.7 filed on Aug. 27, 2021, the contents of which are incorporated herein by reference in their entirety.

TECHNICAL FIELD

The present disclosure relates to an optical waveguide near-to-eye display device, in particular to a folding optical waveguide near-to-eye display device.

BACKGROUND

At present, most of the prior art of an optical machine of an optical waveguide near-to-eye display device adopts a technical solution of lens imaging and adding a small-angle array reflecting lens with multi-layer coating.

However, the technical solution has the following disadvantages:
1. the volume of the lens imaging part is large so that the volume of the whole near-to-eye display device is unable to be reduced, and the weight of the whole near-to-eye display device is heavy;
2. the field angle is small, the vertical field angle is less than 25 degrees, and the maximum horizontal field angle is less than 40 degrees;
3. the reflected light from the array after the first reflective array has to pass through an array reflecting coating before it at least 3 times, which may lead to severe brightness attenuation;
4. it needs to go through the multi-layer coating, the coating process is complicated, the yield is not high, and the light and dark stripes of the reflected picture cannot be completely improved;
5. in order to achieve the horizontal field angle close to 40 degrees, it is necessary to use optical glass with a high refractive index, and the optical plastic resin temporarily cannot achieve a high refractive index and a high optical performance.

SUMMARY

In order to overcome the above-mentioned disadvantages of the prior art, one object of the present disclosure is to provide a folding optical waveguide near-to-eye display device, which greatly reduces the volume of a near-to-eye display device by a reflection method of adopting a prism and a curved surface.

Another object of the present disclosure is to provide a folding optical waveguide near-to-eye display device, which can increase the vertical field angle from less than 25 degrees to more than 36 degrees by a catoptric imaging method of adopting a cylindrical lens, a prism, and curved surface transmission, and can increase the horizontal field angle from less than 40 degrees to more than 55 degrees by adopting pictures of each transmission part of left and right image sources to combine a complete large field angle picture at human eyes.

Another object of the present disclosure is to provide a folding optical waveguide near-to-eye display device, by adopting a reflective lens with a horizontal deflection angle greater than or equal to 30 degrees, so that reflected light of an array after a first reflective array only needs to pass through an array reflecting coating before it once, which greatly reduces the attenuation of brightness.

Another object of the present disclosure is to provide a folding optical waveguide near-to-eye display device, by increasing an angle of a reflective lens, any imaging light of a picture to be displayed can be reflected or transmitted at most once on each array reflecting lens, which can greatly reduce the number of coating layers of the array reflecting lens, improve a yield, and also ensure purity and a uniformity of a reflected image on each array reflecting lens, providing users with high-quality picture enjoyment.

In order to achieve the above objects, the present disclosure provides a folding optical waveguide near-to-eye display device, including: an image source (111), a first prism (121) with a cylindrical surface, a curved lens (131), a second prism (141), and a prism group (151) connected by two or more prisms glued together in sequence, a prism surface of the first prism (121) is partially or completely a cylindrical surface, and the cylindrical surface faces the image source (111), and the first prism (121) is connected to the second prism (141) through a prism surface other than the cylindrical surface to form a first gluing surface, and the first prism (121) is connected with an opposite surface of a curved surface of the curved lens (131) through another prism surface other than the cylindrical surface to form a second gluing surface, and the second prism (141) and the prisms of the prism group (151) are glued and connected in sequence.

Preferably, a concave side of the cylindrical surface faces the image source (111).

Preferably, a radius of curvature of the cylindrical surface is less than 40 mm.

Preferably, angles between the first gluing surface and an axial direction of the cylindrical surface, and between the first gluing surface and the second gluing surface are between 35 and 55 degrees.

Preferably, the first gluing surface is coated with a partially transmissive and partially reflective coating or a reflective polarizing coating, preferably, if the first gluing surface is coated with the reflective polarizing coating, a quarter phase retardation coating is additionally coated on the second gluing surface.

Preferably, the curved surface of the curved lens (131) is coated with an inward high-reflecting coating.

Preferably, gluing surfaces of an array gluing surface group formed by sequentially gluing the second prism (141) and the prisms of the prism group (151) are parallel to each other, and an included angle between each gluing surface and a lower surface is greater than 30 degrees.

Preferably, the array gluing surface is coated with the partially transmissive and partially reflective coating.

Preferably, the second prism (141) is formed by gluing a trapezoidal prism and a quadrilateral prism, prism surfaces of the quadrilateral prism are not perpendicular to each other. A side surface between two bottom surfaces of the trapezoidal prism is glued to the first prism of the prism group (151), and another side surface opposite to the side surface is glued with a prism surface of the quadrilateral prism opposite to the first gluing surface to form a third gluing surface. After gluing, at least one prism surface of the quadrilateral prism, of which the prism surfaces are not perpendicular to each other, is on the same plane as a bottom surface of the trapezoidal prism.

Compared with the prior art, the folding optical waveguide near-to-eye display device of the present disclosure effectively shortens the optical path space by adopting a prism and a curved lens for multiple refraction and reflection, and achieves the purpose of reducing the volume and weight of the device. And through the use of a cylindrical lens in front of the image source, and the combination of pictures of each transmission part of left and right to form a complete high-quality picture with a large horizontal field angle, the vertical and horizontal field angle are greatly increased. The present disclosure also discloses an array reflecting coating with a horizontal inclination angle greater than 30 degrees, which reduces the attenuation of brightness, improves the uniformity of the picture, simplifies the coating process, and improves the yield of the product.

BRIEF DESCRIPTION OF DRAWINGS

The sole figure is a schematic diagram of the structure of a folding optical waveguide near-to-eye display device of the present disclosure.

DETAILED DESCRIPTION

The following describes the implementation of the present disclosure through specific embodiments in conjunction with the accompanying drawings. Those skilled in the art can easily understand other advantages and effects of the present disclosure from the content disclosed in this specification. The present disclosure can also be implemented or applied through other different specific embodiments, and various details in this specification may also be based on different viewpoints and applications, and various modifications and changes may be made without departing from the spirit of the present disclosure.

The sole figure is a schematic cross-sectional view of a folding optical waveguide near-to-eye display device of the present disclosure. As shown in the sole figure, a folding optical waveguide near-to-eye display device of the present disclosure, including: an image source 111, a first prism 121 with a cylindrical surface, a curved lens 131, a second prism 141, and a prism group 151 connected by two or more prisms glued together in sequence.

A prism surface, of the first prism 121, facing the image source 111 is partially or completely set as a cylindrical surface, that is to say, the cylindrical surface can occupy the entire prism surface of the first prism 121, or it can occupy part of the prism surface to reduce the volume. A concave side of the cylindrical surface faces the image source 111, and the first prism 121 is connected to a surface of the second prism 141 by gluing a prism surface other than the cylindrical surface of the first prism 121 with the surface of the second prism 141. In an embodiment of the present disclosure, the first prism 121 adopts a cylindrical surface with a radius of curvature of less than 40 mm. A connecting surface between the first prism 121 and the second prism 141 is a first gluing surface (the prism surface of the second prism 141 used for gluing may be larger than or equal to the prism surface of the first prism 121 used for gluing). In order to achieve better transmission and reflection, the first gluing surface is coated with a partially transmissive and partially reflective coating (that is, a beam splitting coating that splits a same beam of light so that part of the light is reflected and the rest is transmitted) or a reflective polarizing coating. The first prism 121 is also glued and connected to an opposite surface, opposite to a curved surface coated with a high-reflecting coating, of the curved lens 131 through another prism surface, and a connecting surface between the first prism 121 and the curved lens 131 is a second gluing surface. The second gluing surface is coated with a phase retardation coating or not coated. If the first gluing surface is coated with the partially transmissive and partially reflective coating, the second gluing surface may not be coated. If the first gluing surface is coated with the reflective polarizing coating, the second gluing surface needs to be coated with the phase retardation coating, preferably be coated with a quarter phase retardation coating additionally. Angles between the first gluing surface and an axial direction of the cylindrical surface, and between the first gluing surface and the second gluing surface are between 35 and 55 degrees. In an embodiment of the present disclosure, the first prism 121 may be a cylindrical-surface triangular prism. That is, a part or a whole of one prism surface of the triangular prism is set as a cylindrical surface, and the other two prism surfaces are glued with the second prism 141 and the curved lens 131 respectively; in order to achieve better reflection, the curved surface of the curved lens 131 is coated with an inward high-reflecting coating; in an embodiment of the present disclosure, the second prism 141 is an unconventional prism, which can be formed by gluing two quadrilateral prisms, one of which is a trapezoidal prism. One side surface between two bottom surfaces of the trapezoidal prism is glued to the first prism of the prism group 151, and another side surface opposite to the side surface is glued with a prism surface, opposite to the first gluing surface, of the quadrilateral prism of which prism surfaces are not perpendicular to each other, to form a third gluing surface. The gluing surfaces of the quadrilateral prism, of which the prism surfaces are not perpendicular to each other, and the trapezoidal prism have the same size. After gluing, at least one prism surface of the quadrilateral prism is on the same plane as a bottom surface of the trapezoidal prism, in embodiments of the present disclosure, an angle between the prism surface and the first gluing surface is preferably not greater than 30 degrees. Of course, the quadrilateral prism in the present disclosure may also be made into a non-cold-working prism as shown in the sole figure, the present disclosure is not limited thereto; the prism group 151 may be formed by sequentially gluing one or more parallel quadrilateral prisms and a trapezoidal prism, that is, the second prism 141 and each prism of the prism group 151 are glued and connected in sequence, that is, the second prism 141 is glued and connected to the first prism of the prism group 151, and the first prism of the prism group 151 is glued and connected to the second prism of the prism group 151, and so on, the prisms are glued and connected in sequence, and the last one to be glued and connected is the trapezoidal prism. Connecting surfaces between the prisms, of the second prism 141 and the prism group 151, are an array gluing surface group. Gluing surfaces of the array gluing surface group are parallel to each other, and an included angle between each gluing surface and a lower surface (which can refer to a surface close to an eye or a surface away from the eye) is greater than 30 degrees. An array gluing surface is coated with a partially transmissive and partially reflective coating. The present disclosure uses a mirror coating with a horizontal inclination angle greater than 30 degrees to make any imaging light of a picture to be displayed at most reflected or transmitted once on array reflecting lens, which can greatly reduce attenuation of brightness.

The image source 111 may be a micro display screen, which belongs to an object plane of imaging optical equipment. Light emitted from any field point of the object plane enters the first prism 121 through the cylindrical surface of the first prism 121. Since the concave side of the cylindrical surface faces the image source 111, an incident angle scattered on both sides is reduced relative to a plane, therefore, a use of a cylindrical surface with a radius of curvature of less than 40 mm can increase a vertical field angle to more than 36 degrees. Image light is transmitted to the first gluing surface through the cylindrical surface. The first gluing surface is coated with the partially transmissive and partially reflective coating or the reflective polarizing coating (if the first gluing surface is coated with the reflective polarizing coating, the quarter phase retardation coating needs to be additionally coated on the second gluing surface), therefore, most of the light is reflected by the first gluing surface, and then enters the curved lens 131 through the second gluing surface. The curved surface of the curved lens is coated with the inward high-reflecting coating, therefore, a magnified virtual image is formed after the light is highly reflected by the curved surface. The light reflected by the curved surface passes through the second gluing surface and the first gluing surface, and reaches the array gluing surface group of the prism group 151 after one or more total reflections in the second prism 141, and then the light is reflected to a human eye 161 by the array gluing surface group, so that a complete and high-quality image with a large field angle can be seen.

Compared with the prior art, the present disclosure has the following advantages:

1. The present disclosure discloses a reflection method of adopting a prism and a curved lens, and the volume thereof is obviously smaller and lighter than that of the lens imaging components in the prior art.
2. The present disclosure discloses a catoptric imaging method of adopting a prism with a cylindrical surface, a prism, and a curved surface transmission, the method can increase the vertical field angle from less than 25 degrees to more than 36 degrees, thereby further expanding the field angle without increasing the cost, and can increase the horizontal field angle from less than 40 degrees to more than 55 degrees by adopting pictures of each transmission part of left and right image sources to combine a complete large field angle picture at human eyes.
3. The present disclosure discloses a mirror coating with a horizontal inclination angle greater than 30 degrees, so that any imaging light of the picture to be displayed may be reflected or transmitted on each array reflecting lens at most once, which can greatly reduce the attenuation of brightness.
4. The present disclosure discloses a mirror coating with a horizontal inclination angle greater than 30 degrees, and image light may be reflected or transmitted at most once through any array reflecting lens, which ensures the brightness uniformity of reflection and transmission, thereby reducing the number of coating layers of the array reflecting lens, improving the yield, and also ensuring the purity of the reflected picture on each array reflecting lens, so that provides users with high-quality picture enjoyment.

The above embodiments are merely illustrative of the principles and effects of the present disclosure and are not intended to limit the present disclosure. Any person skilled in the art may make modifications and changes to the above embodiments without departing from the spirit and scope of the present disclosure. Therefore, the scope of protection of the present disclosure should be as set forth in the claims.

The invention claimed is:

1. A folding optical waveguide near-to-eye display device, comprising: an image source (111), a first prism (121) with a cylindrical surface, a curved lens (131), a second prism (141), and a prism group (151) connected by two or more prisms glued together in sequence, wherein a prism surface of the first prism (121) is partially or completely a cylindrical surface, the cylindrical surface faces the image source (111), the first prism (121) is connected to the second prism (141) through a prism surface other than the cylindrical surface to form a first gluing surface, the first prism (121) is connected with an opposite surface of a curved surface of the curved lens (131) through another prism surface other than the cylindrical surface to form a second gluing surface, and the second prism (141) and the prisms of the prism group (151) are glued and connected in sequence;

wherein angles between the first gluing surface and an axial direction of the cylindrical surface, and between the first gluing surface and the second gluing surface are between 35 and 55 degrees; and wherein the first gluing surface is coated with a partially transmissive and partially reflective coating or a reflective polarizing coating.

2. The folding optical waveguide near-to-eye display device according to claim 1, wherein a concave side of the cylindrical surface faces the image source (111).

3. The folding optical waveguide near-to-eye display device according to claim 2, wherein a radius of curvature of the cylindrical surface is less than 40 mm.

4. The folding optical waveguide near-to-eye display device as claimed in claim 1, wherein the first gluing surface is coated with the reflective polarizing coating, and a quarter phase retardation coating is additionally coated on the second gluing surface.

5. The folding optical waveguide near-to-eye display device as claimed in claim 1, wherein the curved surface of the curved lens (131) is coated with an inward high-reflecting coating.

6. The folding optical waveguide near-to-eye display device as claimed in claim 1, wherein gluing surfaces of an array gluing surface group formed by sequentially gluing the second prism (141) and the prisms of the prism group (151) are parallel to each other, and an included angle between each gluing surface and a lower surface is greater than 30 degrees.

7. The folding optical waveguide near-to-eye display device as claimed in claim 6, wherein the array gluing surface is coated with a partially transmissive and partially reflective coating.

8. The folding optical waveguide near-to-eye display device as claimed in claim 1, wherein the second prism (141) is formed by gluing a trapezoidal prism and a quadrilateral prism, prism surfaces of the quadrilateral prism are not perpendicular to each other, a side surface between two bottom surfaces of the trapezoidal prism is glued to a first prism of the prism group (151), another side surface opposite to the side surface is glued with a prism surface of the quadrilateral prism opposite to the first gluing surface to form a third gluing surface, and after gluing, at least one prism surface of the quadrilateral prism is on a same plane as a bottom surface of the trapezoidal prism.

* * * * *